US 9,921,577 B2

(12) United States Patent
Bianucci et al.

(10) Patent No.: US 9,921,577 B2
(45) Date of Patent: Mar. 20, 2018

(54) METHOD AND SYSTEM FOR DIAGNOSTIC RULES FOR HEAVY DUTY GAS TURBINES (71) Applicant: Nuovo Pignone Srl, Florence (IT)

(72) Inventors: David Bianucci, Florence (IT); Abdurrahman Abdallah Khalidi, Doha (QA); Antonio Pumo, Florence (IT); Riccardo Crociani, Florence (IT)

(73) Assignee: Nuovo Pignone Srl, Florence (IT)

( * ) Notice: Subject to any disclaimer, the term of this patent is extended or adjusted under 35 U.S.C. 154(b) by 167 days.

(21) Appl. No.: 14/382,028

(22) PCT Filed: Mar. 1, 2013

(86) PCT No.: PCT/EP2013/054161
§ 371 (c)(1),
(2) Date: Aug. 29, 2014

(87) PCT Pub. No.: WO2013/127998
PCT Pub. Date: Sep. 6, 2013

(65) Prior Publication Data
US 2015/0013440 A1   Jan. 15, 2015

(30) Foreign Application Priority Data

Mar. 1, 2012   (IT) .............................. CO2012A0008

(51) Int. Cl.
*G01M 15/14* (2006.01)
*G05B 23/02* (2006.01)
(Continued)

(52) U.S. Cl.
CPC ....... *G05B 23/0245* (2013.01); *F01D 21/003* (2013.01); *F02C 7/00* (2013.01);
(Continued)

(58) Field of Classification Search
USPC ........................................ 73/112.01, 112.03
See application file for complete search history.

(56) References Cited

U.S. PATENT DOCUMENTS

| | | |
|---|---|---|
| 3,898,439 A | 8/1975 | Reed et al. |
| 4,249,238 A | 2/1981 | Spang, III et al. |

(Continued)

FOREIGN PATENT DOCUMENTS

| | | |
|---|---|---|
| CN | 1494670 A | 5/2004 |
| CN | 1621671 A | 6/2005 |

(Continued)

OTHER PUBLICATIONS

Theilliol et al., "A hierarchical fault diagnosis method using a decision support system applied to a chemical plant", Systems, man and cybernetics, Intelligent Systems for the 21st Century, IEEE International Conference on Vancouver, BC, Canada, NY, USA, IEEE, US, vol. No. 3, pp. 2205-2210, Oct. 22, 1995.

(Continued)

*Primary Examiner* — Eric S McCall
(74) *Attorney, Agent, or Firm* — GE Global Patent Operation (57) ABSTRACT

A method for monitoring and diagnosing anomalies in auxiliary systems of a gas turbine implemented using a computer device coupled to a user interface and a memory device, the method including storing a plurality rule sets in the memory device, the rule sets relative to the auxiliary systems of the gas turbine, the rule sets including at least one rule expressed as a relational expression of a real-time data output relative to a real-time data input, the relational expression being specific to parameters associated with the auxiliary systems of the gas turbine, receiving real-time and historical data inputs from a condition monitoring system associated with the gas turbine, the data inputs relating to process parameters associated with the auxiliary systems of (Continued)

the gas turbine, and estimating values for at least some of the parameters associated with the auxiliary systems of the gas turbine using the received inputs.

11 Claims, 5 Drawing Sheets

(51) Int. Cl.

| | | |
|---|---|---|
| *F02C 7/00* | (2006.01) | |
| *G05B 11/06* | (2006.01) | |
| *H04L 29/08* | (2006.01) | |
| *F04B 51/00* | (2006.01) | |
| *G01L 3/10* | (2006.01) | |
| *F01D 21/00* | (2006.01) | |
| *G01K 13/00* | (2006.01) | |

(52) U.S. Cl.
CPC .............. *F04B 51/00* (2013.01); *G01K 13/00* (2013.01); *G01L 3/10* (2013.01); *G01M 15/14* (2013.01); *G05B 11/06* (2013.01); *G05B 23/0216* (2013.01); *G05B 23/0218* (2013.01); *G05B 23/0283* (2013.01); *H04L 67/10* (2013.01); *F05D 2260/80* (2013.01)

(56) References Cited

U.S. PATENT DOCUMENTS

| | | | |
|---|---|---|---|
| 4,449,358 A | 5/1984 | Mani | |
| 4,969,796 A | 11/1990 | Wescott et al. | |
| 5,271,215 A | 12/1993 | Guillet | |
| 5,761,895 A | 6/1998 | Chu et al. | |
| 5,806,299 A | 9/1998 | Bauermeister et al. | |
| 6,209,310 B1 | 4/2001 | Kuenzi et al. | |
| 6,338,240 B1 | 1/2002 | Endo et al. | |
| 6,460,346 B1 | 10/2002 | Cleary | |
| 6,530,207 B2 | 3/2003 | Tobo et al. | |
| 6,658,091 B1 | 12/2003 | Naidoo et al. | |
| 6,795,798 B2 | 9/2004 | Eryurek et al. | |
| 7,254,491 B2 | 8/2007 | Mylaraswamy et al. | |
| 7,398,182 B2 | 7/2008 | Petit | |
| 7,702,447 B2 | 4/2010 | Volponi | |
| 7,831,704 B2 | 11/2010 | Schachtely et al. | |
| 8,818,684 B2 | 8/2014 | John et al. | |
| 2002/0013664 A1 | 1/2002 | Strackeljan et al. | |
| 2002/0193933 A1 | 12/2002 | Adibhatla et al. | |
| 2003/0041135 A1 | 2/2003 | Keyes et al. | |
| 2003/0053906 A1 | 3/2003 | Itou et al. | |
| 2003/0055534 A1 | 3/2003 | Saito et al. | |
| 2003/0061879 A1 | 4/2003 | Otsuka | |
| 2004/0011056 A1 | 1/2004 | Yee et al. | |
| 2004/0024568 A1 | 2/2004 | Eryurek et al. | |
| 2004/0148129 A1 | 7/2004 | Gotoh et al. | |
| 2004/0148940 A1 | 8/2004 | Venkateswaran et al. | |
| 2005/0033481 A1 | 2/2005 | Budhraja et al. | |
| 2005/0096759 A1 | 5/2005 | Benjamin, IV et al. | |
| 2005/0240289 A1 | 10/2005 | Hoyte et al. | |
| 2006/0025961 A1 | 2/2006 | Appel et al. | |
| 2006/0031187 A1 | 2/2006 | Pyrce et al. | |
| 2006/0116847 A1 | 6/2006 | Plotts et al. | |
| 2006/0241910 A1 | 10/2006 | Petchenev et al. | |
| 2007/0056387 A1 | 3/2007 | Obikawa | |
| 2007/0104306 A1 | 5/2007 | Umezawa et al. | |
| 2007/0118270 A1 | 5/2007 | Wiseman et al. | |
| 2007/0186557 A1 | 8/2007 | Gallagher et al. | |
| 2007/0203669 A1 | 8/2007 | Hayashi | |
| 2007/0234730 A1 | 10/2007 | Markham et al. | |
| 2008/0133679 A1 | 6/2008 | Addy | |
| 2008/0208429 A1 | 8/2008 | Saravanapriyan et al. | |
| 2008/0243352 A1 | 10/2008 | Healy | |
| 2009/0055105 A1 | 2/2009 | Yoshida et al. | |
| 2009/0125206 A1 | 5/2009 | Tisenchek et al. | |
| 2009/0149972 A1 | 6/2009 | Nasle | |
| 2009/0324389 A1 | 12/2009 | Fischetti et al. | |
| 2010/0024536 A1 | 2/2010 | Adibhatla et al. | |
| 2010/0080685 A1 | 4/2010 | Morgan et al. | |
| 2010/0257838 A1 | 10/2010 | Mazzaro et al. | |
| 2010/0262401 A1 | 10/2010 | Pfeifer et al. | |
| 2010/0290889 A1 | 11/2010 | Fedor | |
| 2010/0324870 A1 | 12/2010 | Beckman et al. | |
| 2011/0062708 A1 | 3/2011 | Prochaska et al. | |
| 2011/0112797 A1 | 5/2011 | Nëhse et al. | |
| 2011/0162386 A1 | 7/2011 | Chandrabose et al. | |
| 2011/0178737 A1 | 7/2011 | Hudson et al. | |
| 2011/0247406 A1 | 10/2011 | Grosse-Laxzen et al. | |
| 2011/0289899 A1 | 12/2011 | De La Cruz Garcia et al. | |
| 2012/0016824 A1 | 1/2012 | Kalinkin et al. | |
| 2012/0150335 A1 | 6/2012 | Prabhu et al. | |
| 2012/0279230 A1 | 11/2012 | Botarelli | |
| 2013/0098042 A1 | 4/2013 | Frealle et al. | |
| 2013/0103353 A1 | 4/2013 | Kloppner | |

FOREIGN PATENT DOCUMENTS

| | | |
|---|---|---|
| CN | 1690684 A | 11/2005 |
| CN | 1690685 A | 11/2005 |
| CN | 1721275 A | 1/2006 |
| CN | 1892029 A | 1/2007 |
| CN | 101206160 A | 6/2008 |
| CN | 101858826 A | 10/2010 |
| CN | 102027348 A | 4/2011 |
| CN | 102192985 A | 9/2011 |
| CN | 102226428 A | 10/2011 |
| CN | 102252850 A | 11/2011 |
| CN | 102312728 A | 1/2012 |
| DE | 102010026678 A1 | 1/2012 |
| EP | 0198502 A1 | 10/1986 |
| EP | 1556598 B1 | 9/2006 |
| EP | 2138726 A2 | 12/2009 |
| EP | 2345878 A2 | 7/2011 |
| GB | 2085528 A | 4/1982 |
| JP | 4713023 A | 6/1972 |
| JP | 572497 A | 1/1982 |
| JP | 5838329 A | 3/1983 |
| JP | 60142070 A | 7/1985 |
| JP | 60216098 A | 10/1985 |
| JP | 0255807 A | 2/1990 |
| JP | 03155350 A | 7/1991 |
| JP | 476232 A | 3/1992 |
| JP | 0586898 A | 4/1993 |
| JP | 08189846 A | 7/1996 |
| JP | 09166029 A | 6/1997 |
| JP | 2000205563 A | 7/2000 |
| JP | 2002180851 A | 6/2002 |
| JP | 2003090297 A | 3/2003 |
| JP | 2003091313 A | 3/2003 |
| JP | 2003111475 A | 4/2003 |
| JP | 2004501465 A | 1/2004 |
| JP | 2004232643 A | 8/2004 |
| JP | 2004278395 A | 10/2004 |
| JP | 2005502021 A | 1/2005 |
| JP | 2005135422 A | 5/2005 |
| JP | 2005135430 A | 5/2005 |
| JP | 2005134812 A | 6/2005 |
| JP | 2005195257 A | 7/2005 |
| JP | 2006125275 A | 5/2006 |
| JP | 2006302293 A | 11/2006 |
| JP | 2007138937 A | 6/2007 |
| JP | 2007218254 A | 8/2007 |
| JP | 2007231804 A | 9/2007 |
| JP | 2008097643 A | 4/2008 |
| JP | 2008175149 A | 7/2008 |
| JP | 2009043266 A | 2/2009 |
| JP | 2009047092 A | 3/2009 |
| JP | 2010031842 A | 2/2010 |
| JP | 2010084764 A | 4/2010 |
| JP | 2010265901 A | 11/2010 |
| JP | 2011137448 A | 7/2011 |
| JP | 2011247265 A | 12/2011 |
| JP | 2011256734 A | 12/2011 |
| JP | 2012008782 A | 1/2012 |
| JP | 2012530975 A | 12/2012 |
| JP | 2013512381 A | 4/2013 |

(56) References Cited

FOREIGN PATENT DOCUMENTS

| RU | 2005112459 A | 9/2005 |
|---|---|---|
| RU | 2005141148 A | 5/2006 |
| RU | 66447 U1 | 9/2007 |
| RU | 2010121150 A | 12/2011 |
| RU | 2010144075 A | 5/2012 |
| WO | 0169329 A2 | 9/2001 |
| WO | 02103177 A1 | 12/2002 |
| WO | 2005041209 A1 | 5/2005 |
| WO | 2005124491 A1 | 12/2005 |
| WO | 2011003688 A1 | 1/2011 |
| WO | 2011073350 A1 | 6/2011 |
| WO | 2011075233 A1 | 6/2011 |

OTHER PUBLICATIONS

Wurzbach, "Infrared Thermography of Fan and Compressor Systems in a Predictive Maintenance Program", Proceedings SPIE, Thermosense XX, vol. No. 3361, Apr. 13, 1998.
Bayley, "Flows and temperatures in compressor and turbine wheel spaces", Proceedings of the Institution of Mechanical Engineers, Part C: Journal of Mechanical Engineering Science, vol. No. 213, Issue No. 5, pp. 451-460, May 1, 1999.
Gulen et al., "Real-Time On-Line Performance Diagnostics of Heavy-Duty Industrial Gas Turbines", Journal of Engineering for Gas Turbines and Power, ASME, vol. No. 124, pp. 910-921, Oct. 1, 2002.
Brooks, "GE Gas Turbine Performance Characteristics", GE Power Systems, Oct. 31, 2000.
Davis et al., "Dry Low NOx Combustion Systems for GE Heavy-Duty Gas Turbines", GE Power Systems, Oct. 31, 2000.
Search Report and Written Opinion issued in connection with corresponding IT Application No. CO2012A000008 dated Oct. 22, 2012.
International Search Report and Written Opinion issued in connection with corresponding PCT Application No. PCT/EP2013/054098 dated May 21, 2013.
International Search Report and Written Opinion issued in connection with corresponding PCT Application No. PCT/EP2013/054162 dated Jun. 25, 2013.
International Search Report and Written Opinion issued in connection with corresponding PCT Application No. PCT/EP2013/054158 dated Jul. 1, 2013.
International Search Report and Written Opinion issued in connection with corresponding PCT Application No. PCT/EP2013/054154 dated Jul. 4, 2013.
International Search Report and Written Opinion issued in connection with corresponding PCT Application No. PCT/EP2013/054161 dated Jul. 9, 2013.
International Search Report and Written Opinion issued in connection with corresponding PCT Application No. PCT/EP2013/054157 dated Jul. 19, 2013.
International Search Report and Written Opinion issued in connection with corresponding PCT Application No. PCT/EP2013/054156 dated Jan. 8, 2014.
Unofficial English Translation of Chinese Office Action issued in connection with related CN Application No. 201380012020.4 dated May 23, 2016.
Notice of Allowance issued in connection with related U.S. Appl. No. 14/382,036 dated Oct. 21, 2015.
Unofficial English translation of Office Action issued in connection with related CN Application No. 201380011998.9 dated Dec. 25, 2015.
Unofficial English Translation of Chinese Office Action issued in connection with corresponding CN Application No. 201380011941.9 dated Jan. 25, 2016.
Unofficial English Translation of Chinese Office Action issued in connection with related CN Application No. 201380012000.7 dated Feb. 3, 2016.

Hui-Ming, "Analysis and Handling of the Combustion Fault in a S109FA Gas Turbine", Power Equipment, vol. No. 25, Issue No. 5, pp. 331-335, Sep. 2011.
Unofficial English translation of Office Action issued in connection with related CN Application No. 201380012462.9 dated Apr. 1, 2016.
Unofficial English translation of Office Action issued in connection with related CN Application No. 201380012036.5 dated Feb. 22, 2016.
Russian Search Report issued in connection with Related RU Application No. 2014133939 dated Dec. 13, 2016.
Russian Search Report issued in connection with corresponding RU Application No. 2014133935 dated Dec. 14, 2016.
Russian Search Report issued in connection with Related RU Application No. 2014133942 dated Dec. 14, 2016.
Russian Notice of Acceptance issued in connection with corresponding RU Application No. 2014133935 dated Dec. 29, 2016.
Russian Notice of Acceptance issued in connection with Related RU Application No. 2014133939 dated Dec. 29, 2016.
Unofficial English Translation of Russian Office action issued in connection with related RU Application No. 2014133941 dated Jan. 12, 2017.
Unofficial English Translation of Japanese Office action issued in connection with related JP Application No. 2014559227 dated Jan. 24, 2017.
Russian Office action issued in connection with related RU Application No. 2014134207 dated Jan. 24, 2017.
Unofficial English Translation of Japanese Search Report issued in connection with related JP Application No. 2014559227 dated Feb. 1, 2017.
U.S. Appl. No. 14/382,036, filed Aug. 29, 2014, Ali et al.
U.S. Appl. No. 14/382,013, filed Aug. 29, 2014, Ceccherini et al.
U.S. Appl. No. 14/382,063, filed Aug. 29, 2014, Saravanapriyan et al.
U.S. Appl. No. 14/382,049, filed Aug. 29, 2014, Fadlun et al.
U.S. Appl. No. 14/382,076, filed Aug. 29, 2014, Giannini et al.
U.S. Appl. No. 14/382,030, filed Aug. 29, 2014, Saravanapriyan et al.
Unofficial English Translation of Chinese Office Action issued in connection with corresponding CN Application No. 201380011941.9 dated Oct. 17, 2016.
Unofficial English Translation of Japanese Office Action issued in connection with Related JP Application No. 2014-559240 dated Nov. 8, 2016.
Unofficial English Translation of Japanese Office Action issued in connection with Related JP Application No. 2014559241 dated Nov. 8, 2016.
Unofficial English Translation of Japanese Office Action issued in connection with Related JP Application No. 2014559243 dated Nov. 22, 2016.
Unofficial English Translation of Japanese Office Action issued in connection with Related JP Application No. 2014559246 dated Nov. 22, 2016.
Unofficial English Translation of Japanese Search Report issued in connection with Related JP Application No. 2014559240 dated Nov. 30, 2016.
Unofficial English Translation of Japanese Search Report issued in connection with Related JP Application No. 2014559241 dated Nov. 30, 2016.
Unofficial English Translation of Japanese Office Action issued in connection with Related JP Application No. 2014559242 dated Dec. 6, 2016.
Unofficial English Translation of Japanese Office Action issued in connection with corresponding JP Application No. 2014559245 on Dec. 6, 2016.
Unofficial English Translation of Japanese Search Report issued in connection with Related JP Application No. 2014559242 dated Dec. 22, 2016.
Unofficial English Translation of Japanese Search Report issued in connection with corresponding JP Application No. 2014559245 dated Dec. 22, 2016.
U.S. Non-Final Office Action issued in connection with related U.S. Appl. No. 14/382,030 dated Apr. 14, 2017.

(56) References Cited

OTHER PUBLICATIONS

U.S. Non-Final Office Action issued in connection with related U.S. Appl. No. 14/382,013 dated May 5, 2017.
Unofficial English Translation of Chinese Notice of Allowance issued in connection with related CN Application No. 201380012462.9 dated Jun. 8, 2017.
U.S. Non-Final Office Action issued in connection with related U.S. Appl. No. 14/382,076 dated Aug. 9, 2017.
U.S. Final Office Action issued in connection with related U.S. Appl. No. 14/382,049 dated Sep. 5, 2017.

FIG. 5

METHOD AND SYSTEM FOR DIAGNOSTIC RULES FOR HEAVY DUTY GAS TURBINES

FIELD OF THE INVENTION

This description relates to generally to mechanical/electrical equipment operations, monitoring and diagnostics, and more specifically, to systems and methods for automatically advising operators of anomalous behavior of heavy duty gas turbines.

BACKGROUND OF THE INVENTION

Monitoring machinery health and alerting operators to anomalous machinery conditions is an important part of operating one or a fleet of machines. Specifically, monitoring selected auxiliary system process parameters is important to health monitoring of gas turbine auxiliary systems. There is currently no known monitoring system for online estimation of most auxiliary system process parameters, and only the measured parameter is monitored. By not comparing the measured value to an expected value, the dynamic baseline and physical insight to define alarm thresholds are unknown. Without this calculation, only static thresholds based on constant deviation from preset values is available. Further, troubleshooting is hindered without an estimation of the auxiliary system process parameters. For example, a determination can be made as to the source of a deviation between the expected value and the measured value. Moreover, rapidly changing operational conditions or very slowly changing operational conditions may make it difficult for an operator to recognize anomalous conditions or what operational changes can be made to mitigate the anomalous conditions.

At least some known auxiliary system monitoring systems monitor the measured values only and using historical data for the same type of machine static thresholds are predefined, so that if the measured value exceeds the predefined threshold, an alarm is raised. Many attempts are needed to define and refine these thresholds, which do not take into account the machine running or load conditions. Such systems are prone to too many false alarms, and actual faults are generally detected too late. Moreover, only limited or no troubleshooting information is provided in such systems.

SUMMARY OF THE INVENTION

In one embodiment, a computer-implemented method for monitoring and diagnosing anomalies in auxiliary systems of a gas turbine implemented using a computer device coupled to a user interface and a memory device includes storing a plurality rule sets in the memory device, the rule sets relative to the auxiliary systems of the gas turbine, the rule sets including at least one rule expressed as a relational expression of a real-time data output relative to a real-time data input, the relational expression being specific to parameters associated with the auxiliary systems of the gas turbine, receiving real-time and historical data inputs from a condition monitoring system associated with the gas turbine, the data inputs relating to process parameters associated with the auxiliary systems of the gas turbine, and estimating values for at least some of the parameters associated with the auxiliary systems of the gas turbine using the received inputs.

In another embodiment, a monitoring and diagnostic system for auxiliary systems of a gas turbine comprising an axial compressor and a low pressure turbine in flow communication, said system comprising a plurality of rule sets relating to the auxiliary systems, the rule sets each including a relational expression of a real-time data output relative to a real-time data input, the relational expression being specific to inputs relating to respective process parameters of the auxiliary systems.

In yet another embodiment, one or more non-transitory computer-readable storage media has computer-executable instructions embodied thereon, wherein when executed by at least one processor, the computer-executable instructions cause the processor to receive a measured value of a auxiliary system process parameter of a gas turbine, receive measured values and inferred values of parameters associated with the gas turbine, estimate an expected value respective of the received measured value, compare the expected value to the respective measured value, and generate an advisory message recommending an action to be taken based on the comparison

BRIEF DESCRIPTION OF THE DRAWINGS

FIGS. 1-5 show exemplary embodiments of the method and system described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE INVENTION

The following detailed description illustrates embodiments of the invention by way of example and not by way of limitation. It is contemplated that the invention has general application to analytical and methodical embodiments of monitoring equipment operation in industrial, commercial, and residential applications.

As described herein, auxiliary system rule sets include for example, a bearing radial vibrations rule set, a bearing metal temperature rule set, a mineral lube oil system rule set, a hydraulic oil system rule set, a wheel-space rule set, a bleed valves rule set, a combustion spread rule set, a exhaust temperatures rule set, and a ventilation system rule set.

Figure 1:
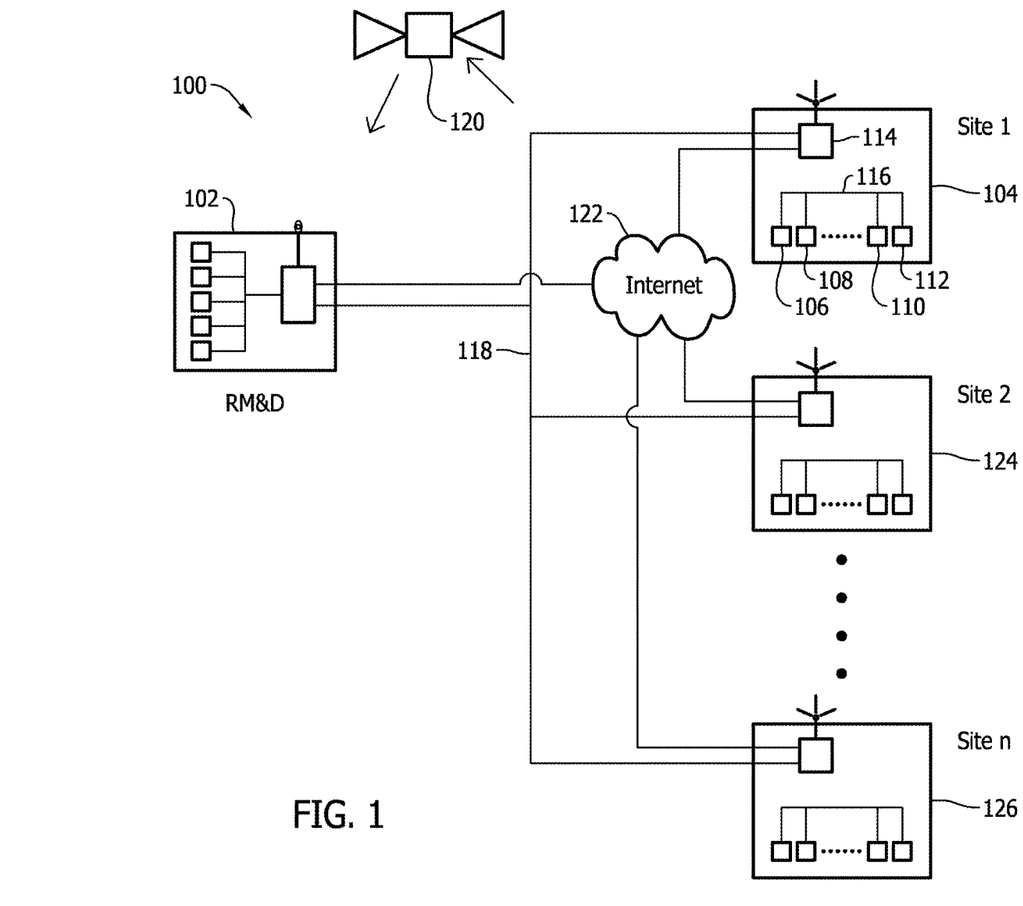
FIG. 1 is a schematic block diagram of a remote monitoring and diagnostic system in accordance with an exemplary embodiment of the present invention.

FIG. 1 is a schematic block diagram of remote monitoring and diagnostic system 100 in accordance with an exemplary embodiment of the present invention. In the exemplary embodiment, system 100 includes a remote monitoring and diagnostic center 102. Remote monitoring and diagnostic center 102 is operated by an entity, such as, an OEM of a plurality of equipment purchased and operated by a separate business entity, such as, an operating entity. In the exemplary embodiment, the OEM and operating entity enter into a support arrangement whereby the OEM provides services related to the purchased equipment to the operating entity. The operating entity may own and operate purchased equipment at a single site or multiple sites. Moreover, the OEM may enter into support arrangements with a plurality of operating entities, each operating their own single site or multiple sites. The multiple sites each may contain identical individual equipment or pluralities of identical sets of equipment, such as trains of equipment. Additionally, at least some of the equipment may be unique to a site or unique to all sites.

In the exemplary embodiment, a first site 104 includes one or more process analyzers 106, equipment monitoring systems 108, equipment local control centers 110, and/or monitoring and alarm panels 112 each configured to interface with respective equipment sensors and control equipment to effect control and operation of the respective equipment. The one or more process analyzers 106, equipment monitoring systems 108, equipment local control centers 110, and/or monitoring and alarm panels 112 are communicatively coupled to an intelligent monitoring and diagnostic system 114 through a network 116. Intelligent monitoring and diagnostic (IMAD) system 114 is further configured to communicate with other on-site systems (not shown in FIG. 1) and offsite systems, such as, but not limited to, remote monitoring and diagnostic center 102. In various embodiments, IMAD 114 is configured to communicate with remote monitoring and diagnostic center 102 using for example, a dedicated network 118, a wireless link 120, and the Internet 122.

Each of a plurality of other sites, for example, a second site 124 and an nth site 126 may be substantially similar to first site 104 although may or may not be exactly similar to first site 104.

Figure 2:
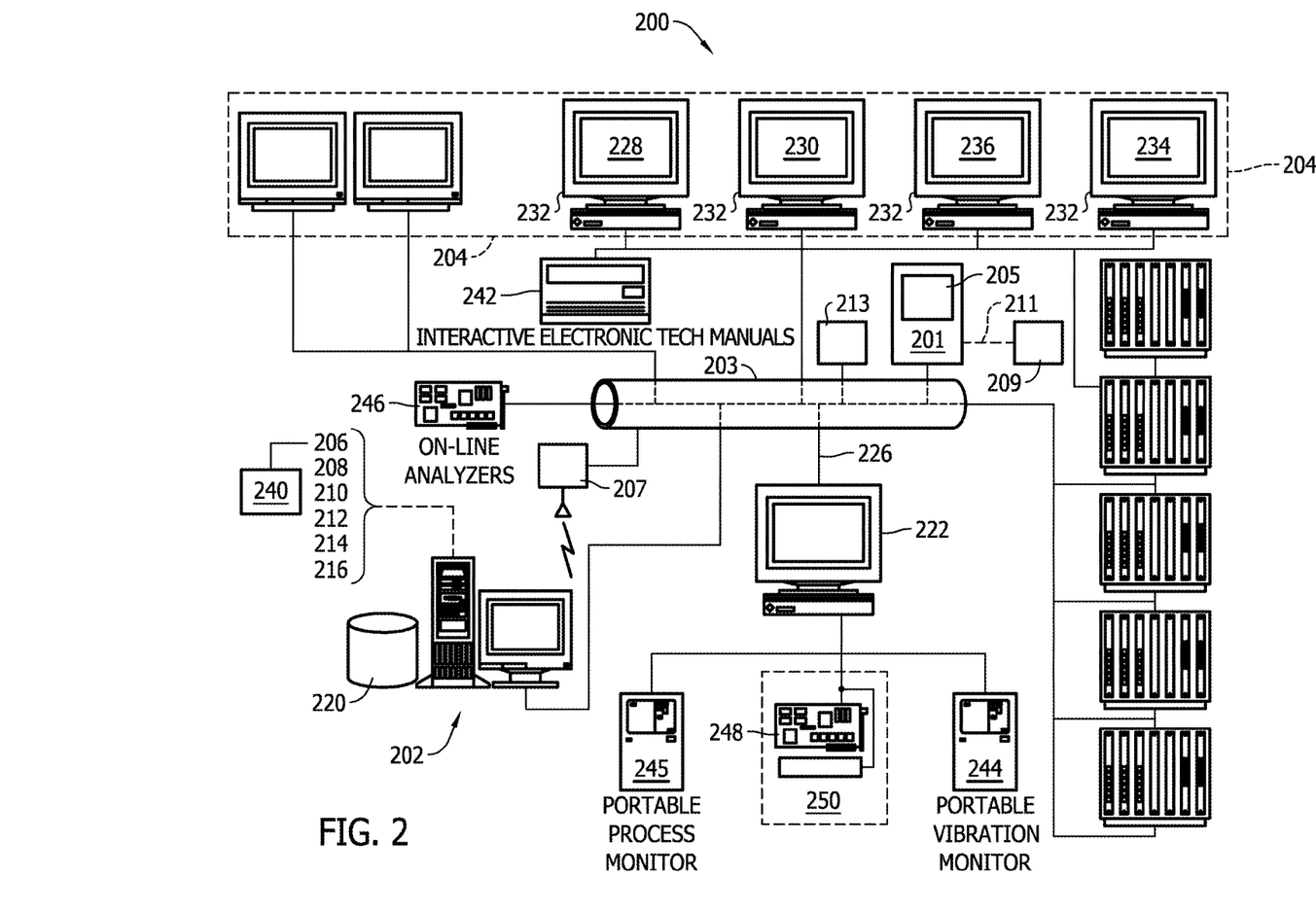
FIG. 2 is a block diagram of an exemplary embodiment of a network architecture of a local industrial plant monitoring and diagnostic system, such as a distributed control system (DCS).

FIG. 2 is a block diagram of an exemplary embodiment of a network architecture 200 of a local industrial plant monitoring and diagnostic system, such as a distributed control system (DCS) 201. The industrial plant may include a plurality of plant equipment, such as gas turbines, centrifugal compressors, gearboxes, generators, pumps, motors, fans, and process monitoring sensors that are coupled in flow communication through interconnecting piping, and coupled in signal communication with DCS 201 through one or more remote input/output (I/O) modules and interconnecting cabling and/or wireless communication. In the exemplary embodiment, the industrial plant includes DCS 201 including a network backbone 203. Network backbone 203 may be a hardwired data communication path fabricated from twisted pair cable, shielded coaxial cable or fiber optic cable, for example, or may be at least partially wireless. DCS 201 may also include a processor 205 that is communicatively coupled to the plant equipment, located at the industrial plant site or at remote locations, through network backbone 203. It is to be understood that any number of machines may be operatively connected to network backbone 203. A portion of the machines may be hardwired to network backbone 203, and another portion of the machines may be wirelessly coupled to backbone 203 via a wireless base station 207 that is communicatively coupled to DCS 201. Wireless base station 207 may be used to expand the effective communication range of DCS 201, such as with equipment or sensors located remotely from the industrial plant but, still interconnected to one or more systems within the industrial plant.

DCS 201 may be configured to receive and display operational parameters associated with a plurality of equipment, and to generate automatic control signals and receive manual control inputs for controlling the operation of the equipment of industrial plant. In the exemplary embodiment, DCS 201 may include a software code segment configured to control processor 205 to analyze data received at DCS 201 that allows for on-line monitoring and diagnosis of the industrial plant machines. Data may be collected from each machine, including gas turbines, centrifugal compressors, pumps and motors, associated process sensors, and local environmental sensors including, for example, vibration, seismic, temperature, pressure, current, voltage, ambient temperature and ambient humidity sensors. The data may be pre-processed by a local diagnostic module or a remote input/output module, or may transmitted to DCS 201 in raw form.

A local monitoring and diagnostic system (LMDS) 213 may be a separate add-on hardware device, such as, for example, a personal computer (PC), that communicates with DCS 201 and other control systems 209 and data sources through network backbone 203. LMDS 213 may also be embodied in a software program segment executing on DCS 201 and/or one or more of the other control systems 209. Accordingly, LMDS 213 may operate in a distributed manner, such that a portion of the software program segment executes on several processors concurrently. As such, LMDS 213 may be fully integrated into the operation of DCS 201 and other control systems 209. LMDS 213 analyzes data received by DCS 201, data sources, and other control systems 209 to determine an operational health of the machines and/or a process employing the machines using a global view of the industrial plant.

In the exemplary embodiment, network architecture 100 includes a server grade computer 202 and one or more client systems 203. Server grade computer 202 further includes a database server 206, an application server 208, a web server 210, a fax server 212, a directory server 214, and a mail server 216. Each of servers 206, 208, 210, 212, 214, and 216 may be embodied in software executing on server grade computer 202, or any combinations of servers 206, 208, 210, 212, 214, and 216 may be embodied alone or in combination on separate server grade computers coupled in a local area network (LAN) (not shown). A data storage unit 220 is coupled to server grade computer 202. In addition, a workstation 222, such as a system administrator's workstation, a user workstation, and/or a supervisor's workstation are coupled to network backbone 203. Alternatively, workstations 222 are coupled to network backbone 203 using an Internet link 226 or are connected through a wireless connection, such as, through wireless base station 207.

Each workstation 222 may be a personal computer having a web browser. Although the functions performed at the workstations typically are illustrated as being performed at respective workstations 222, such functions can be performed at one of many personal computers coupled to network backbone 203. Workstations 222 are described as being associated with separate exemplary functions only to facilitate an understanding of the different types of functions that can be performed by individuals having access to network backbone 203.

Server grade computer 202 is configured to be communicatively coupled to various individuals, including employees 228 and to third parties, e.g., service providers 230. The communication in the exemplary embodiment is illustrated as being performed using the Internet, however, any other wide area network (WAN) type communication can be utilized in other embodiments, i.e., the systems and processes are not limited to being practiced using the Internet.

In the exemplary embodiment, any authorized individual having a workstation 232 can access LMDS 213. At least one of the client systems may include a manager workstation 234 located at a remote location. Workstations 222 may be embodied on personal computers having a web browser. Also, workstations 222 are configured to communicate with server grade computer 202. Furthermore, fax server 212 communicates with remotely located client systems, including a client system 236 using a telephone link (not shown). Fax server 212 is configured to communicate with other client systems 228, 230, and 234, as well.

Computerized modeling and analysis tools of LMDS 213, as described below in more detail, may be stored in server 202 and can be accessed by a requester at any one of client systems 204. In one embodiment, client systems 204 are computers including a web browser, such that server grade computer 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment. Database server 206 is connected to a database 240 containing information about industrial plant 10, as described below in greater detail. In one embodiment, centralized database 240 is stored on server grade computer 202 and can be accessed by potential users at one of client systems 204 by logging onto server grade computer 202 through one of client systems 204. In an alternative embodiment, database 240 is stored remotely from server grade computer 202 and may be non-centralized.

Other industrial plant systems may provide data that is accessible to server grade computer 202 and/or client systems 204 through independent connections to network backbone 204. An interactive electronic tech manual server 242 services requests for machine data relating to a configuration of each machine. Such data may include operational capabilities, such as pump curves, motor horsepower rating, insulation class, and frame size, design parameters, such as dimensions, number of rotor bars or impeller blades, and machinery maintenance history, such as field alterations to the machine, as-found and as-left alignment measurements, and repairs implemented on the machine that do not return the machine to its original design condition.

A portable vibration monitor 244 may be intermittently coupled to LAN directly or through a computer input port such as ports included in workstations 222 or client systems 204. Typically, vibration data is collected in a route, collecting data from a predetermined list of machines on a periodic basis, for example, monthly or other periodicity. Vibration data may also be collected in conjunction with troubleshooting, maintenance, and commissioning activities. Further, vibration data may be collected continuously in a real-time or near real-time basis. Such data may provide a new baseline for algorithms of LMDS 213. Process data may similarly, be collected on a route basis or during troubleshooting, maintenance, and commissioning activities. Moreover, some process data may be collected continuously in a real-time or near real-time basis. Certain process parameters may not be permanently instrumented and a portable process data collector 245 may be used to collect process parameter data that can be downloaded to DCS 201 through workstation 222 so that it is accessible to LMDS 213. Other process parameter data, such as process fluid composition analyzers and pollution emission analyzers may be provided to DCS 201 through a plurality of on-line monitors 246.

Electrical power supplied to various machines or generated by generated by generators with the industrial plant may be monitored by a motor protection relay 248 associated with each machine. Typically, such relays 248 are located remotely from the monitored equipment in a motor control center (MCC) or in switchgear 250 supplying the machine. In addition, to protection relays 248, switchgear 250 may also include a supervisory control and data acquisition system (SCADA) that provides LMDS 213 with power supply or power delivery system (not shown) equipment located at the industrial plant, for example, in a switchyard, or remote transmission line breakers and line parameters.

Figure 3:
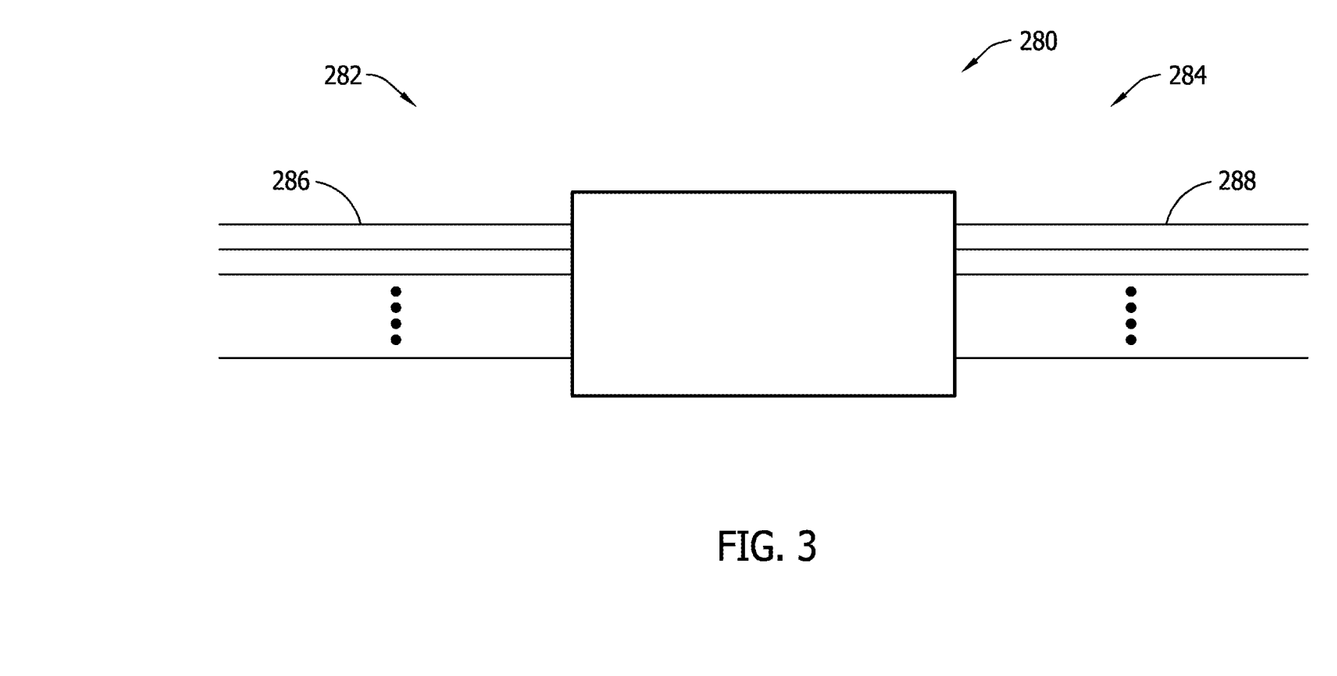
FIG. 3 is a block diagram of an exemplary rule set that may be used with LMDS shown in FIG. 1.

FIG. 3 is a block diagram of an exemplary rule set 280 that may be used with LMDS 213 (shown in FIG. 1). Rule set 280 may be a combination of one or more custom rules, and a series of properties that define the behavior and state of the custom rules. The rules and properties may be bundled and stored in a format of an XML string, which may be encrypted based on a 25 character alphanumeric key when stored to a file. Rule set 280 is a modular knowledge cell that includes one or more inputs 282 and one or more outputs 284. Inputs 282 may be software ports that direct data from specific locations in LMDS 213 to rule set 280. For example, an input from a pump outboard vibration sensor may be transmitted to a hardware input termination in DCS 201. DCS 201 may sample the signal at that termination to receive the signal thereon. The signal may then be processed and stored at a location in a memory accessible and/or integral to DCS 201. A first input 286 of rule set 280 may be mapped to the location in memory such that the contents of the location in memory is available to rule set 280 as an input. Similarly, an output 288 may be mapped to another location in the memory accessible to DCS 201 or to another memory such that the location in memory contains the output 288 of rule set 280.

In the exemplary embodiment, rule set 280 includes one or more rules relating to monitoring and diagnosis of specific problems associated with equipment operating in an industrial plant, such as, for example, a gas reinjection plant, a liquid natural gas (LNG) plant, a power plant, a refinery, and a chemical processing facility. Although rule set 280 is described in terms of being used with an industrial plant, rule set 280 may be appropriately constructed to capture any knowledge and be used for determining solutions in any field. For example, rule set 280 may contain knowledge pertaining to economic behavior, financial activity, weather phenomenon, and design processes. Rule set 280 may then be used to determine solutions to problems in these fields. Rule set 280 includes knowledge from one or many sources, such that the knowledge is transmitted to any system where rule set 280 is applied. Knowledge is captured in the form of rules that relate outputs 284 to inputs 282 such that a specification of inputs 282 and outputs 284 allows rule set 280 to be applied to LMDS 213. Rule set 280 may include only rules specific to a specific plant asset and may be directed to only one possible problem associated with that specific plant asset. For example, rule set 280 may include only rules that are applicable to a motor or a motor/pump combination. Rule set 280 may only include rules that determine a health of the motor/pump combination using vibration data. Rule set 280 may also include rules that determine the health of the motor/pump combination using a suite of diagnostic tools that include, in addition to vibration analysis techniques, but may also include, for example, performance calculational tools and/or financial calculational tools for the motor/pump combination.

In operation, rule set 280 is created in a software developmental tool that prompts a user for relationships between inputs 282 and outputs 284. Inputs 282 may receive data representing, for example digital signals, analog signals, waveforms, processed signals, manually entered and/or configuration parameters, and outputs from other rule sets. Rules within rule set 280 may include logical rules, numerical algorithms, application of waveform and signal processing techniques, expert system and artificial intelligence algorithms, statistical tools, and any other expression that may relate outputs 284 to inputs 282. Outputs 284 may be mapped to respective locations in the memory that are reserved and configured to receive each output 284. LMDS 213 and DCS 201 may then use the locations in memory to accomplish any monitoring and/or control functions LMDS 213 and DCS 201 may be programmed to perform. The rules of rule set 280 operate independently of LMDS 213 and DCS 201, although inputs 282 may be supplied to rule set 280 and outputs 284 may be supplied to rule set 280, directly or indirectly through intervening devices.

During creation of rule set 280, a human expert in the field divulges knowledge of the field particular to a specific asset using a development tool by programming one or more rules. The rules are created by generating expressions of relationship between outputs 284 and inputs 282 such that no coding of the rules is needed. Operands may be selected from a library of operands, using graphical methods, for example, using drag and drop on a graphical user interface built into the development tool. A graphical representation of an operand may be selected from a library portion of a screen display (not shown) and dragged and dropped into a rule creation portion. Relationships between input 282 and operands are arranged in a logical display fashion and the user is prompted for values, such as, constants, when appropriate based on specific operands and specific ones of inputs 282 that are selected. As many rules that are needed to capture the knowledge of the expert are created. Accordingly, rule set 280 may include a robust set of diagnostic and/or monitoring rules or a relatively less robust set of diagnostic and/or monitoring rules based on a customer's requirements and a state of the art in the particular field of rule set 280. The development tool provides resources for testing rule set 280 during the development to ensure various combinations and values of inputs 282 produce expected outputs at outputs 284.

Figure 4:
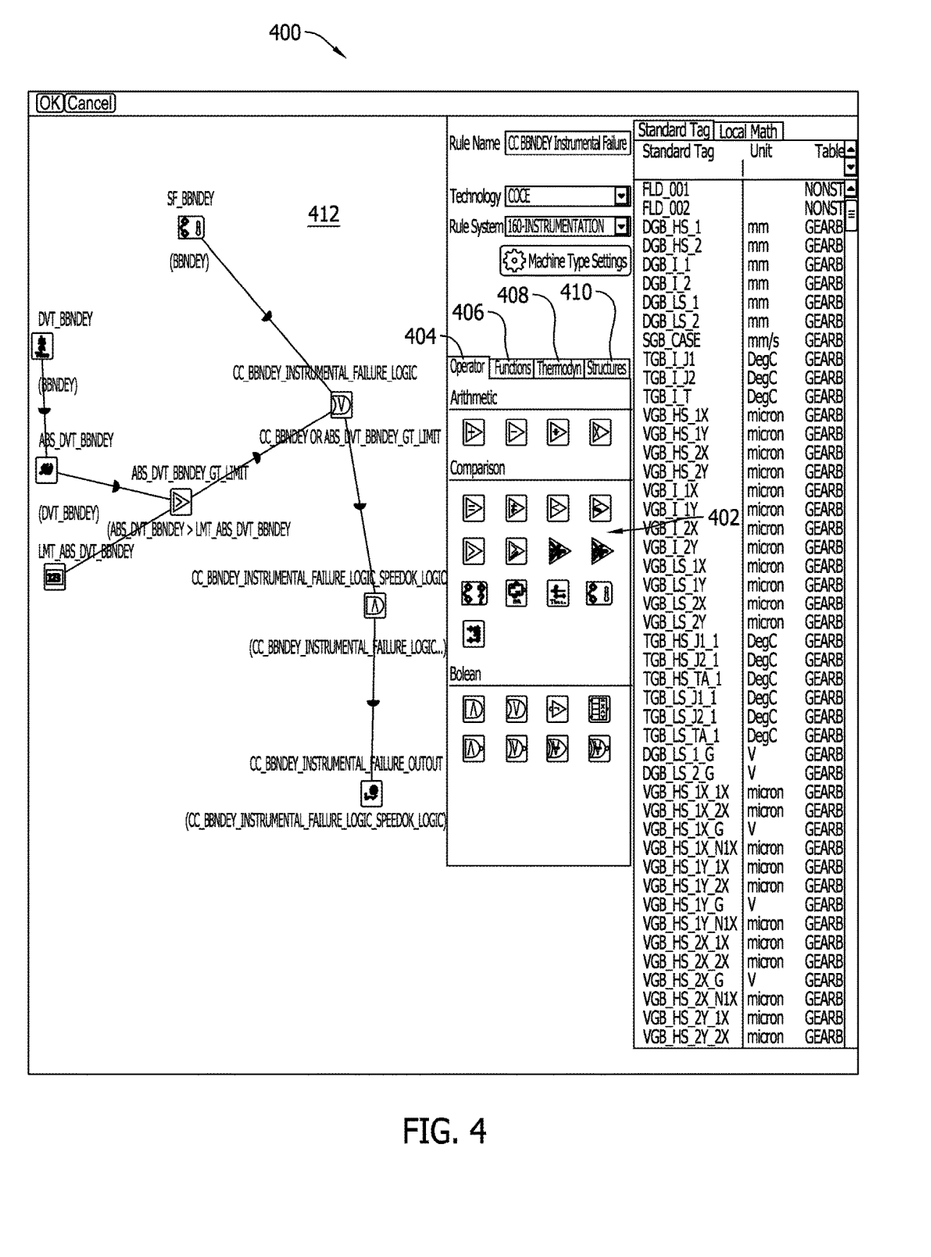
FIG. 4 is a screen capture of a rule building tool in accordance with an exemplary embodiment of the present disclosure.

FIG. 4 is a screen capture of a rule building tool 400 in accordance with an exemplary embodiment of the present disclosure. In the exemplary embodiment, tool 400 uses objects representing programmed operations that are manipulated easily to generate rule sets particular to each auxiliary system parameter to be monitored. The objects are selected in an operator selection area 402, which is accessed by an operator selection tab 404. A function selection tab 406, a thermodynamic algorithm tab 408, and a structures tab 410 are also available for selection. The objects are dragged onto a work area 412 where operator objects are associated with tags to build the logic to generate an output from measured or inferred parameters.

Figure 5:
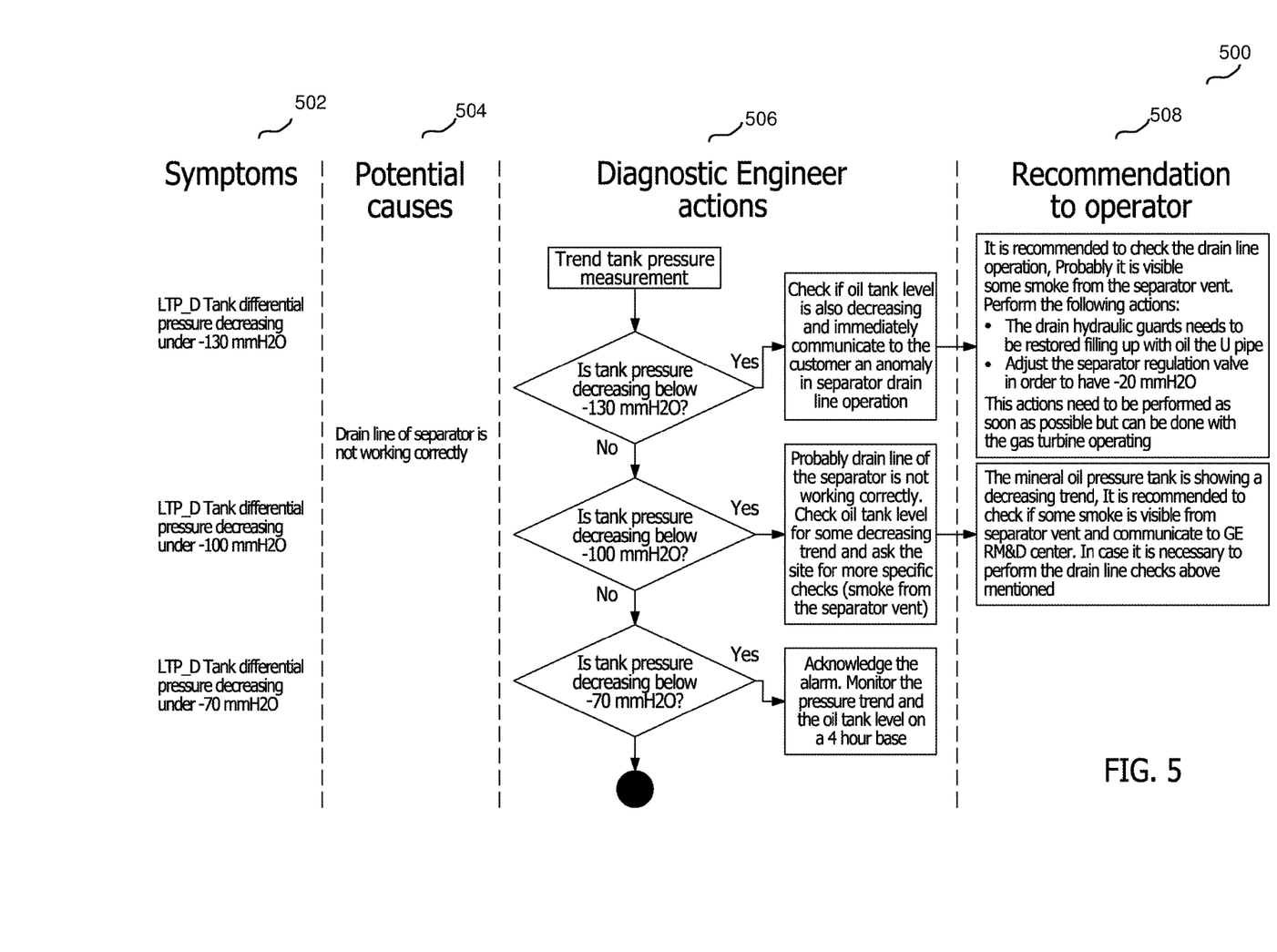
FIG. 5 is a stratified flow diagram 500 illustrating a logic flow for an exemplary auxiliary system process parameter, namely, a tank differential pressure process parameter.

FIG. 5 is a stratified flow diagram 500 illustrating a logic flow for an exemplary auxiliary system process parameter, namely, a tank differential pressure process parameter. Diagram 500 includes a symptom lane 502 for listing symptoms that may be indicated by a rule set as needing attention. The tag of the source of the symptom of concern is listed as well as parameters or conditions that are met to generate the advisory. Diagram 500 also includes a lane 504 for listing potential causes of the symptom listed in lane 502. An action lane 506 lists instructions for a diagnostic engineer to follow to facilitate isolating and possibly correcting the source. In various embodiments, the diagnostic engineer is a third party monitoring the operation of the gas turbine remotely. A recommendation lane 508 lists recommendations to the operator of the gas turbine, which may be more in-depth or require more intervention than the actions transmitted to the diagnostic engineer.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

While the disclosure has been described in terms of various specific embodiments, it will be recognized that the disclosure can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect includes (a) storing a plurality rule sets in the memory device, the rule sets relative to the auxiliary systems of the gas turbine, the rule sets including at least one rule expressed as a relational expression of a real-time data output relative to a real-time data input, the relational expression being specific to parameters associated with the auxiliary systems of the gas turbine, (b) receiving real-time and historical data inputs from a condition monitoring system associated with the gas turbine, the data inputs relating to process parameters associated with the auxiliary systems of the gas turbine, and (c) estimating values for at least some of the parameters associated with the auxiliary systems of the gas turbine using the received inputs. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and online auxiliary system monitoring system that includes a rule module provides a cost-effective and reliable means for providing meaningful operational recommendations and troubleshooting actions. Moreover, the system is more accurate and less prone to false alarms. More specifically, the methods and systems described herein can predict component failure at a much earlier stage than known systems to facilitate significantly reducing outage time and preventing trips. In addition, the above-described methods and systems facilitate predicting anomalies at an early stage enabling site personnel to prepare and plan for a shutdown of the equipment. As a result, the methods and systems described herein facilitate operating gas turbines and other equipment in a cost-effective and reliable manner.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for monitoring and diagnosing anomalies in auxiliary systems of a gas turbine, the method implemented using a system having a processor, a user interface, and a memory, the method comprising:

storing a plurality of rule sets in the memory being relative to the auxiliary systems of the gas turbine, the plurality of rule sets comprising at least one rule expressed as a relational expression of a real-time data output relative to a real-time data input, the relational expression being specific to at least one of process parameters associated with the auxiliary systems of the gas turbine;

receiving real-time and historical data inputs from a condition monitoring system associated with the gas turbine, the real-time and historical data inputs relating to a value of at least one of the process parameters associated with the auxiliary systems of the gas turbine; and estimating values for at least one of the process parameters associated with the auxiliary systems of the gas turbine based on the received real-time and historical data inputs and at least one rule of the plurality of rule sets.

2. The method of claim 1, further comprising:

comparing the estimated values for at least one of the process parameters associated with the auxiliary systems of the gas turbine with a respective actual measured value of at least one of the process parameters associated with the auxiliary systems of the gas turbine; and based on the comparison, generating an advisory message comprising troubleshooting instructions relating to at least one of the auxiliary systems of the gas turbine.

3. The method of claim 1, further comprising receiving inputs representative of at least one of the process parameters relating to at least one of a bearing radial vibration system, a bearing metal temperature system, a mineral lube oil system, a hydraulic oil system, a wheel-space of the turbine, bleed valves of the compressor, a combustion spread, an exhaust temperature system, and a ventilation system.

4. The method of claim 3, wherein receiving inputs representative of at least one of the process parameters relating to the mineral lube oil system comprises receiving inputs representative of at least one of sensor instrumental failures, oil leakages, pump failures, and vapor/oil separator anomalies of the mineral lube oil system.

5. The method of claim 3, wherein receiving inputs representative of at least one of the process parameters relating to the hydraulic oil system comprises receiving inputs representative of at least one of sensor instrumental failures, oil leakages, pump failures, and valve issues.

6. A system for auxiliary systems of a gas turbine, wherein the gas turbine comprising an axial compressor and a low pressure turbine in flow communication, the system comprising:
   a processor;
   a user interface; and
   a memory for storing a plurality of rule sets relating to the auxiliary systems of the gas turbine, the plurality of rule sets comprising at least one rule expressed as a relational expression of a real-time data output relative to a real-time data input, the relational expression being specific to at least one of process parameters of the auxiliary systems of the gas turbine, the memory thereupon stored a set of instructions which, when executed by the processor, causes the system to:
   receive real-time and historical data inputs from a condition monitoring system associated with the gas turbine, the real-time and historical data inputs relating to a value of at least one of the process parameters associated with the auxiliary systems of the gas turbine; and
   estimate values for at least one of the process parameters associated with the auxiliary systems of the gas turbine based on the real-time and historical data inputs and at least one rule of the plurality of rule sets.

7. The system of claim 6, wherein the memory thereupon stored the set of instructions which, when executed by the processor, causes the system to further:
   determine the estimated values for at least one of the process parameters associated with the auxiliary systems of the gas turbine using the real-time and historical data inputs.

8. The system of claim 6, wherein the memory thereupon stored the set of instructions which, when executed by the processor, causes the system to further:
   compare the estimated values for at least one of the process parameters associated with the auxiliary systems of the gas turbine with a respective actual measured value of at least one of the process parameters associated with the auxiliary systems of the gas turbine; and
   based on the comparison, generate an advisory message comprising troubleshooting instructions relating to at least one of the auxiliary systems of the gas turbine.

9. The system of claim 6, wherein the memory thereupon stored the set of instructions which, when executed by the processor, causes the system to further:
   receive inputs representative of at least one of the process parameters relating to at least one of a bearing radial vibration system, a bearing metal temperature system, a mineral lube oil system, a hydraulic oil system, a wheel-space of the turbine, bleed valves of the compressor, combustion spread, an exhaust temperature system, and a ventilation system.

10. The system of claim 9, wherein the memory thereupon stored the set of instructions which, when executed by the processor, causes the system to further:
    receive inputs representative of instrument failure and actual anomalous behavior of the bearing radial vibration system.

11. The system of claim 9, wherein the memory thereupon stored the set of instructions which, when executed by the processor, causes the system to further:
    receive inputs representative of instrument failure and actual anomalous behavior of the bearing metal temperature system.

* * * * *